(12) United States Patent  
Miller et al.

(10) Patent No.: US 12,510,104 B2  
(45) Date of Patent: Dec. 30, 2025

(54) GAS TURBINE ENGINE WITH ACOUSTIC SPACING OF THE FAN BLADES AND OUTLET GUIDE VANES

(71) Applicant: General Electric Company, Evendale, OH (US)

(72) Inventors: Brandon Wayne Miller, Evendale, OH (US); Egbert Geertsema, Evendale, OH (US); Arthur W. Sibbach, Boxford, MA (US); Andrew Hudecki, Evendale, OH (US); Timothy Richard DePuy, Evendale, OH (US); John C. Schilling, Evendale, OH (US); Frank Worthoff, Evendale, OH (US); Tsuguji Nakano, Evendale, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/199,194

(22) Filed: May 5, 2025

(65) Prior Publication Data

US 2025/0382974 A1    Dec. 18, 2025

Related U.S. Application Data

(63) Continuation-in-part of application No. 18/744,069, filed on Jun. 14, 2024, now Pat. No. 12,292,017.

(51) Int. Cl.
*F02K 3/06* (2006.01)
*F02C 7/045* (2006.01)
(Continued)

(52) U.S. Cl.
CPC .............. *F04D 29/666* (2013.01); *F02K 3/06* (2013.01); *F05D 2200/12* (2013.01);
(Continued)

(58) Field of Classification Search
CPC .... F02K 3/06; F02C 7/045; F02C 7/24; F04D 29/666; F05D 2220/36; F05D 2240/12; F05D 2260/96; F05D 2300/603
See application file for complete search history.

(56) References Cited

U.S. PATENT DOCUMENTS 3,294,364 A    12/1966 Stanley
3,505,819 A    4/1970 Wilde
(Continued)

FOREIGN PATENT DOCUMENTS

EP    3 085 897 B1    9/2021

OTHER PUBLICATIONS

Gliebe et al., *Ultra-High Bypass Engine Aeroacoustic Study*. No. NASA/CR-2003-212525, 2003.

*Primary Examiner* — Brian Christopher Delrue
(74) *Attorney, Agent, or Firm* — Klarquist Sparkman, LLP

(57) ABSTRACT

A gas turbine engine comprises a fan, a core turbine engine coupled to the fan, a fan case housing the fan and the core turbine engine, a plurality of outlet guide vanes extending between the core turbine engine and the fan case, and an acoustic spacing. The acoustic spacing parameter, in combination with composite fan blades that include one or both of a fan leading edge to trailing edge compression factor (FLTCF) and a fan leading edge to trailing edge opening ratio (FLTOR), provide improved performance and reduced acoustic noise.

20 Claims, 5 Drawing Sheets

| Engine | As (329) | c (210) chord length | rr radius ratio | S span | Nb | Nv/Nb | γ stagger angle | BEAL | ASR | FBD |
|---|---|---|---|---|---|---|---|---|---|---|
| #1 | 20.0 | 27 | 0.350 | 25.0 | 16 | 2.6 | 33 | 4.70 | 1.62 | 76.9 (#1) |
| #2 | 3.0 | 10 | 0.350 | 24.0 | 20 | 3.0 | 30 | 0.56 | 1.80 | 73.8 (#1) |
| #3 | 9.0 | 26 | 0.300 | 30.0 | 24 | 2.1 | 31 | 2.30 | 1.88 | 85.7 (#2) |
| #4 | 11.0 | 20 | 0.250 | 26.0 | 22 | 3.0 | 35 | 1.53 | 2.40 | 69.3 (#1) |
| #5 | 2.0 | 8 | 0.200 | 28.0 | 22 | 3.0 | 30 | 0.22 | 2.96 | 70.0 (#1) |
| #6 | 6.0 | 16 | 0.250 | 30.0 | 20 | 2.5 | 45 | 0.80 | 2.98 | 80.0 (#2) |
| #7 | 10.0 | 31 | 0.300 | 28.0 | 26 | 2.0 | 34 | 3.13 | 1.60 | 80.0 (#2) |
| #8 | 20.0 | 20 | 0.330 | 30.0 | 14 | 2.9 | 30 | 2.46 | 2.84 | 89.6 (#2) |
| #9 | 10.0 | 18 | 0.340 | 32.0 | 22 | 3.0 | 31 | 1.20 | 2.79 | 97.0 (#3) |
| #10 | 10.0 | 20 | 0.330 | 35.0 | 16 | 2.8 | 55 | 1.22 | 2.91 | 104.5 (#3) |
| #11 | 21.0 | 29 | 0.210 | 38.0 | 16 | 2.5 | 31 | 3.00 | 2.80 | 96.2 (#3) |
| #12 | 18.0 | 35 | 0.290 | 40.0 | 20 | 3.0 | 36 | 3.49 | 1.72 | 112.7 (#3) |
| #13 | 13.1 | 12.8 | 0.275 | 31.9 | 22 | 2.2 | 43.0 | 0.47 | 12.75 | 88.0 (#2) |
| #14 | 13.9 | 12.8 | 0.275 | 31.9 | 22 | 2.2 | 43.0 | 0.47 | 13.53 | 88.0 (#2) |
| #15 | 19.5 | 13.5 | 0.210 | 28.0 | 14 | 2.9 | 55.0 | 0.68 | 10.11 | 80.0 (#2) |
| #16 | 16.5 | 18.5 | 0.270 | 37.2 | 16 | 2.3 | 53.0 | 0.95 | 7.73 | 101.9 (#3) |
| #17 | 16.5 | 18.5 | 0.270 | 32.0 | 16 | 2.3 | 53.0 | 1.10 | 6.65 | 87.7 (#2) |
| #18 | 14.5 | 12.8 | 0.280 | 31.4 | 20 | 3.0 | 43.0 | 0.53 | 9.12 | 87.2 (#2) |
| #19 | 10.3 | 12.8 | 0.275 | 28.0 | 22 | 2.2 | 43.0 | 0.54 | 8.80 | 77.2 (#1) |
| #20 | 5.5 | 14.0 | 0.275 | 29.0 | 22 | 2.2 | 43.0 | 0.62 | 4.07 | 80.0 (#2) |
| #21 | 3.8 | 11.0 | 0.275 | 33.0 | 22 | 2.2 | 43.0 | 0.34 | 5.18 | 91.0 (#2) |
| #22 | 14.0 | 12.0 | 0.275 | 32.0 | 22 | 2.2 | 43.0 | 0.41 | 15.55 | 88.3 (#2) |

(51) Int. Cl.
*F02C 7/24* (2006.01)
*F02C 7/36* (2006.01)
*F04D 29/66* (2006.01)

(52) U.S. Cl.
CPC ...... *F05D 2200/13* (2013.01); *F05D 2200/14* (2013.01); *F05D 2200/221* (2013.01); *F05D 2200/262* (2013.01); *F05D 2220/36* (2013.01); *F05D 2260/961* (2013.01)

(56) References Cited

U.S. PATENT DOCUMENTS

| | | | |
|---|---|---|---|
| 3,534,556 A | | 10/1970 | Wilde |
| 5,123,813 A | | 6/1992 | Przytulski et al. |
| 5,169,288 A | | 12/1992 | Gliebe et al. |
| 5,255,510 A | * | 10/1993 | Lardellier ............... F02K 3/075 60/226.3 |
| 5,299,914 A | * | 4/1994 | Schilling ................ F01D 5/141 416/223 A |
| 5,486,095 A | | 1/1996 | Rhoda et al. |
| 6,195,983 B1 | | 3/2001 | Wadia et al. |
| 6,447,250 B1 | | 9/2002 | Corrigan et al. |
| 7,118,331 B2 | | 10/2006 | Shahpar |
| 7,374,403 B2 | | 5/2008 | Decker et al. |
| 7,374,404 B2 | | 5/2008 | Schilling et al. |
| 8,403,624 B2 | | 3/2013 | Xie et al. |
| 8,425,192 B2 | | 4/2013 | Hoyland et al. |
| 8,869,504 B1 | | 10/2014 | Schwarz et al. |
| 9,399,922 B2 | | 7/2016 | Lamboy et al. |
| 9,500,126 B2 | | 11/2016 | Schwarz et al. |
| 9,540,938 B2 | | 1/2017 | Topol et al. |
| 10,107,191 B2 | | 10/2018 | Gilson et al. |
| 10,247,018 B2 | | 4/2019 | Topol et al. |
| 10,458,425 B2 | | 10/2019 | Boyer et al. |
| 10,458,426 B2 | | 10/2019 | Wilkin, II |
| 10,557,361 B1 | | 2/2020 | Karkos et al. |
| 10,578,018 B2 | | 3/2020 | Schwarz et al. |
| 10,584,632 B1 | | 3/2020 | Kannangara et al. |
| 10,605,117 B2 | | 3/2020 | Wang et al. |
| 10,677,264 B2 | * | 6/2020 | Moniz ................ F04D 29/324 |
| 10,711,797 B2 | | 7/2020 | Kroger et al. |
| 10,738,630 B2 | | 8/2020 | Li et al. |
| 10,760,488 B2 | | 9/2020 | Schwarz et al. |
| 10,815,886 B2 | | 10/2020 | Kroger et al. |
| 11,199,196 B2 | | 12/2021 | Breen |
| 11,377,958 B2 | | 7/2022 | Lemarchand et al. |
| 11,492,918 B1 | | 11/2022 | Ostdiek |
| 12,012,898 B2 | * | 6/2024 | Miller ................ F02K 3/06 |
| 12,292,017 B1 | * | 5/2025 | Miller ................ F02C 7/24 |
| 2003/0012654 A1 | | 1/2003 | Strassberger et al. |
| 2006/0228206 A1 | | 10/2006 | Decker et al. |
| 2008/0283676 A1 | | 11/2008 | Jain et al. |
| 2009/0082976 A1 | | 3/2009 | Anuzis et al. |
| 2013/0266447 A1 | | 10/2013 | Evans et al. |
| 2014/0186187 A1 | | 7/2014 | Lamboy et al. |
| 2015/0044028 A1 | | 2/2015 | Lord et al. |
| 2016/0363137 A1 | | 12/2016 | Topol et al. |
| 2017/0022820 A1 | | 1/2017 | Joseph et al. |
| 2017/0122215 A1 | * | 5/2017 | Houston ............... F02C 7/36 |
| 2017/0184053 A1 | | 6/2017 | Harvey et al. |
| 2017/0298954 A1 | * | 10/2017 | Qiu ................ F04D 29/547 |
| 2017/0314562 A1 | | 11/2017 | Rose |
| 2017/0350413 A1 | | 12/2017 | Boyer et al. |
| 2018/0030926 A1 | | 2/2018 | Eckett et al. |
| 2018/0106274 A1 | | 4/2018 | Moniz et al. |
| 2019/0055847 A1 | | 2/2019 | De Gaillard et al. |
| 2019/0128123 A1 | | 5/2019 | Paruchuri et al. |
| 2019/0376529 A1 | | 12/2019 | Joseph et al. |
| 2020/0123921 A1 | | 4/2020 | Kray et al. |
| 2020/0347785 A1 | | 11/2020 | Morin et al. |
| 2020/0355082 A1 | | 11/2020 | Theertham |
| 2020/0400069 A1 | | 12/2020 | Aguilera et al. |
| 2022/0042461 A1 | * | 2/2022 | Molesini ................ F02C 7/06 |
| 2022/0049621 A1 | | 2/2022 | Sawyers-Abbott et al. |
| 2022/0049656 A1 | | 2/2022 | Sawyers-Abbott et al. |
| 2023/0151777 A1 | | 5/2023 | Bifulco et al. |
| 2023/0280035 A1 | * | 9/2023 | Depperschmidt ......... F23R 3/50 60/39.76 |
| 2024/0151185 A1 | * | 5/2024 | Miller ................ F02K 3/06 |
| 2024/0271528 A1 | | 8/2024 | Raghuvaran et al. |
| 2024/0318614 A1 | * | 9/2024 | Mondal ................ F02C 3/06 |

* cited by examiner

| Engine | As (320) | c (210) chord length | rr radius ratio | S span | Nb | Nv/Nb | γ stagger angle | BEAL | ASR | FBD |
|---|---|---|---|---|---|---|---|---|---|---|
| #1 | 20.0 | 27 | 0.350 | 25.0 | 16 | 2.6 | 33 | 4.70 | 1.62 | 76.9 (#1) |
| #2 | 3.0 | 10 | 0.350 | 24.0 | 20 | 3.0 | 30 | 0.56 | 1.80 | 73.8 (#1) |
| #3 | 9.0 | 26 | 0.300 | 30.0 | 24 | 2.1 | 31 | 2.30 | 1.88 | 85.7 (#2) |
| #4 | 11.0 | 20 | 0.250 | 26.0 | 22 | 3.0 | 35 | 1.53 | 2.40 | 69.3 (#1) |
| #5 | 2.0 | 8 | 0.200 | 28.0 | 22 | 3.0 | 30 | 0.22 | 2.96 | 70.0 (#1) |
| #6 | 6.0 | 16 | 0.250 | 30.0 | 20 | 2.5 | 45 | 0.80 | 2.98 | 80.0 (#2) |
| #7 | 10.0 | 31 | 0.300 | 28.0 | 26 | 2.0 | 34 | 3.13 | 1.60 | 80.0 (#2) |
| #8 | 20.0 | 20 | 0.330 | 30.0 | 14 | 2.9 | 30 | 2.46 | 2.84 | 89.6 (#2) |
| #9 | 10.0 | 18 | 0.340 | 32.0 | 22 | 3.0 | 31 | 1.20 | 2.79 | 97.0 (#3) |
| #10 | 10.0 | 20 | 0.330 | 35.0 | 16 | 2.8 | 55 | 1.22 | 2.91 | 104.5 (#3) |
| #11 | 21.0 | 29 | 0.210 | 38.0 | 16 | 2.5 | 31 | 3.00 | 2.80 | 96.2 (#3) |
| #12 | 18.0 | 35 | 0.290 | 40.0 | 20 | 3.0 | 36 | 3.49 | 1.72 | 112.7 (#3) |
| #13 | 13.1 | 12.8 | 0.275 | 31.9 | 22 | 2.2 | 43.0 | 0.47 | 12.75 | 88.0 (#2) |
| #14 | 13.9 | 12.8 | 0.275 | 31.9 | 22 | 2.2 | 43.0 | 0.47 | 13.53 | 88.0 (#2) |
| #15 | 19.5 | 13.5 | 0.210 | 28.0 | 14 | 2.9 | 55.0 | 0.68 | 10.11 | 80.0 (#2) |
| #16 | 16.5 | 18.5 | 0.270 | 37.2 | 16 | 2.3 | 53.0 | 0.95 | 7.73 | 101.9 (#3) |
| #17 | 16.5 | 18.5 | 0.270 | 32.0 | 16 | 2.3 | 53.0 | 1.10 | 6.65 | 87.7 (#2) |
| #18 | 14.5 | 12.8 | 0.280 | 31.4 | 20 | 3.0 | 43.0 | 0.53 | 9.12 | 87.2 (#2) |
| #19 | 10.3 | 12.8 | 0.275 | 28.0 | 22 | 2.2 | 43.0 | 0.54 | 8.80 | 77.2 (#1) |
| #20 | 5.5 | 14.0 | 0.275 | 29.0 | 22 | 2.2 | 43.0 | 0.62 | 4.07 | 80.0 (#2) |
| #21 | 3.8 | 11.0 | 0.275 | 33.0 | 22 | 2.2 | 43.0 | 0.34 | 5.18 | 91.0 (#2) |
| #22 | 14.0 | 12.0 | 0.275 | 32.0 | 22 | 2.2 | 43.0 | 0.41 | 15.55 | 88.3 (#2) |

FIG. 4

GAS TURBINE ENGINE WITH ACOUSTIC SPACING OF THE FAN BLADES AND OUTLET GUIDE VANES

CROSS-REFERENCE TO RELATED APPLICATION

This application is a continuation-in-part of U.S. application Ser. No. 18/744,069, filed Jun. 14, 2024. The prior application is incorporated herein by reference in its entirety.

FIELD

This application generally relates to gas turbine engines for aircraft and, more particularly, to geared gas turbine engines with an acoustic spacing and other noise-reducing architecture.

BACKGROUND

A gas turbine engine for an aircraft typically includes a fan, a compressor, a combustion section, a turbine section, and a nozzle section. The fan propels air entering the gas turbine engine into the compressor. The compressor increases the pressure of the air as the air is routed into the combustion section. The combustion section combusts the pressurized air with fuel to produce combustion gases. The combustion gases are routed through the turbine section and exit the gas turbine engine via the nozzle section, thereby producing thrust.

BRIEF DESCRIPTION OF THE DRAWINGS

FIG. 4 shows exemplary acoustic spacing ratios for exemplary gas turbine engines.

DETAILED DESCRIPTION

Figure 1:
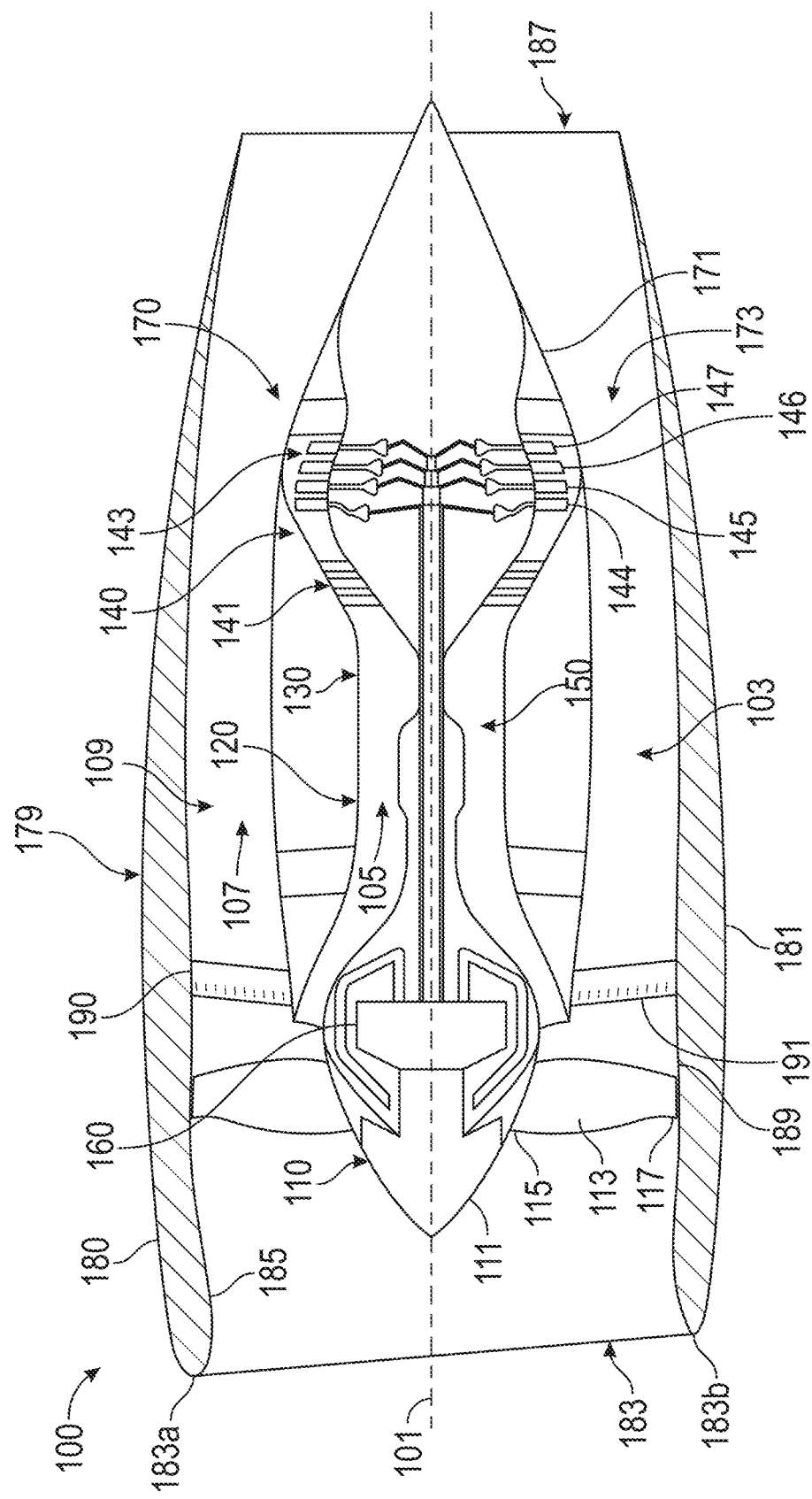
FIG. 1 shows a schematic view of an exemplary gas turbine engine, according to one example.

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Features and characteristics described in conjunction with a particular aspect, embodiment or example are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are relatively discernable by one of ordinary skill in the art.

As used herein, the terms "a", "an", and "at least one" encompass one or more of the specified element. That is, if two of a particular element are present, one of these elements is also present and thus "an" element is present. The terms "a plurality of" and "plural" mean two or more of the specified element. As used herein, the term "and/or" used between the last two of a list of elements means any one or more of the listed elements. For example, the phrase "A, B, and/or C" means "A," "B," "C," "A and B," "A and C," "B and C" or "A, B and C." As used herein, the term "coupled" generally means physically, chemically, electrically, magnetically, or otherwise coupled or linked and does not exclude the presence of intermediate elements between the coupled items absent specific contrary language.

The term "turbomachine" refers to a machine including one or more compressors, a heat generating section (e.g., a combustion section), and one or more turbines that together generate a torque output.

The terms "forward" and "aft" refer to relative positions within a gas turbine engine or vehicle, and refer to the normal operational attitude of the gas turbine engine or vehicle. For example, with regard to a gas turbine engine, forward refers to a position relatively closer to the nose of an aircraft and aft refers to a position relatively closer to a tail of the aircraft.

As used herein in this application and in the claims, the term "axial" refers to a dimension extending along a central longitudinal axis of the gas turbine engine from a forward portion of the gas turbine engine to an aft portion of the gas turbine engine.

As used herein in this application and in the claims, the term "radial" refers to a dimension extending radially outwards from the central longitudinal axis.

As used herein in this application and in the claims, the term "OGV" refers to an outlet guide vane of the gas turbine engine.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The term "disk loading" refers to an average pressure change across a plurality of rotor blades of a rotor assembly, such as the average pressure change across a plurality of fan blades of a fan.

As used herein, the term "rated speed" with reference to a gas turbine engine refers to a maximum rated speed of the gas turbine engine. For example, in an engine certified by the Federal Aviation Administration ("FAA"), the rated speed refers to a rotation speed of the engine during the highest sustainable and continuous power operation in the certification documents, such as a rotational speed of the gas turbine engine when operating under a maximum continuous operation.

The term "cruise operating mode" refers to a specific configuration or setting of the gas turbine engine that controls for, e.g., performance and fuel efficiency during a cruise phase of flight.

The term "thrust rating" for a gas turbine engine refers to a maximum amount of thrust the gas turbine engine can generate when operating at the rated speed during standard day operating conditions (i.e., sea level under standard temperature and pressure conditions).

As used herein, the term "fan pressure ratio" as it relates to a plurality of fan blades of a fan, refers to a ratio of an air pressure immediately downstream of the fan blades during operation of the fan to an air pressure immediately upstream of the fan blades of the fan during operation of the fan.

The term "bypass ratio" refers to a ratio in a gas turbine engine of a mass flowrate of an airflow from a primary fan that is bypassed around the engine's upstream-most ducted inlet (downstream of the primary fan of the engine) to a mass flowrate of an airflow that passes through the engine's ducted inlet. For example, in the embodiment of FIGS. 1, and 4 discussed below, the bypass ratio refers to a mass flowrate of an airflow from a fan 38, 152 that flows over an outer casing 18 or a fan cowl 170 to a mass flowrate of an airflow from the fan 38, 152 that flows through the engine inlet 20, 182. The bypass ratio may be defined during operation of the gas turbine engine in a cruise operating mode.

As used herein, the term "composite material" refers to a material produced from two or more constituent materials, wherein at least one of the constituent materials is a non-metallic material. Example composite materials include polymer matrix composites (PMC), ceramic matrix composites (CMC), chopped fiber composite materials, etc.

As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Gas turbine engines generate significant noise during operation and it is desirable to reduce the amount of noise generated. The degree of noise generated is a function of, among other things, the relative positioning of components of the engine. Modifications to the engine's architecture, such as the relative position of a vane downstream of a rotating part and the airfoil characteristics of the vane, can have a significant impact on the noise generated. However, changes made to reduce noise can also negatively impact performance in terms of weight, drag, etc. One cannot simply change relative positions or airfoil characteristics without imposing significant penalties on the engine drag, weight, etc. Thus, there are difficult trade-offs to be made between, on the one hand, reducing the noise envelope to satisfy more stringent community noise requirements and, on the other hand, not negating performance improvements (weight, drag, specific fuel consumption, etc.) for the sake of reducing the noise generated at take-off. Conventional methods of reducing gas turbine engine noise, such as varying fan pressure ratio ("FPR"), can be insufficient to meet increasingly stringent community noise requirements.

The inventors of the present disclosure have found that a quieter gas turbine engine can be achieved by providing a specific range of acoustic spacing between the fan blades and OGVs in combination with specific ranges of certain other features of the engine architecture. Such a configuration of the fan blades and OGVs may maintain a desired overall propulsive efficiency for the turbofan engine while desirably reducing the noise generated by the engine. As part of the process of determining this acoustic spacing, the inventors discovered that a relationship between a ratio of the acoustic spacing and a blade effective acoustic length, which is determined based on particular features of fan (e.g., chord length, span, stagger angle, radius ratio, number of blades), can provide desirable improvements in noise reductions for the gas turbine engine.

The inventors have also found that, in combination with the reductions based on acoustic spacing parameters, the use of composite fan blades also provides significant acoustic benefits. Composite materials enable the design of larger fan blades, which can operate at lower fan pressure ratios and higher bypass ratios. These characteristics can further contribute to reduced noise generation during operation, improving the acoustic performance of the gas turbine engine.

As described herein, by forming fan blades out of composite materials, the size of the fan blades can be increased both in radial length and chord length, as composite materials provide improved strength characteristics over certain metal materials traditionally used for fan blade design. This increase in size allows for a reduced fan pressure ratio for a given thrust design point of the gas turbine engine. Specifically, forming the fan blades out of composite materials enables the fan to have a lower solidity and lower fan blade count for the given thrust design point, resulting from the increased size of the fan blades.

The lower solidity and lower fan blade count enabled by composite fan blades can permit a lower hub radius, particularly at the leading edge of the fan blades. This configuration improves the efficiency of the fan at the hub and allows for overall shorter fan blades, as the fan blades can "start" at a closer radial distance to the centerline of the gas turbine engine.

Additionally, including a reduction gearbox in the gas turbine engine design allows for a reduction in the rotational speed of the fan, further reducing the fan pressure ratio. While excessively slowing the fan blades can result in a stall during certain operations, increasing the size of the fan blades, as enabled by the use of composite materials disclosed herein, ensures that the fan can still provide the desired mass flowrate of airflow to achieve the required thrust output.

Through the design of gas turbine engines with composite fan blades, relationships among key parameters—such as leading edge tip radius, leading edge hub radius, trailing edge tip radius, and trailing edge hub radius—have been identified. These relationships correlate with the solidity and fan blade count of the fan, demonstrating that lower leading edge and trailing edge hub radii (for given leading edge and trailing edge tip radii) require a fan with lower solidity and a lower fan blade count. This configuration results in a net benefit to the overall gas turbine engine design, including improved aeronautical efficiency and acoustic performance.

While manufacturing components out of composite materials can be labor-intensive or require significant upfront automation design costs, the benefits of composite fan blades outweigh these challenges. The improved composite fan blades, when used in combination with the improvements provided by the acoustic spacing parameters disclosed herein, result in gas turbine engines with improved aeronautical efficiency and acoustic characteristics.

FIG. 1 is a schematic cross-section view of a gas turbine engine 100 configured to produce thrust or power for an aircraft. In some examples, the gas turbine engine 100 can be an aircraft engine configured to produce at least 17,500 horsepower of thrust. In other examples, the gas turbine engine 100 can be an aircraft engine configured to produce between 1 and 17,500 horsepower of thrust.

The gas turbine engine 100 defines a central longitudinal axis 101 extending between a forward portion and a rear portion of the gas turbine engine 100. The gas turbine engine 100 includes a core turbine engine 103 centered about the central longitudinal axis 101, a fan 110 disposed forward of the core turbine engine 103, a nacelle 179 which includes a fan case 180 encasing or housing the fan 110, and outlet guide vanes ("OGVs") 190 disposed aft of the fan 110 and extending radially between the core turbine engine 103 and the fan case 180. FIG. 1 illustrates a fan case 180 generally extending to the aft end of the gas turbine engine; however, in other examples, the length and/or relative position of the fan case to the gas turbine engine (forward and/or aft) may vary.

The fan 110 is configured to propel air through the gas turbine engine 100. During the operation of the gas turbine engine 100, the fan 110 draws a first portion of the air 105 into the core turbine engine 103. The fan 110 draws a second portion of the air 107 into a bypass stream 109 disposed outside the core turbine engine 103. The fan 110 comprises a fan disk 111 and a plurality of fan blades 113 that radially extend from the fan disk 111. However, other examples of the fan 110 can comprise additional or alternative components.

The fan disk 111 is centered about and is configured to rotate about the central longitudinal axis 101. The fan disk 111 comprises a front hub that can be aerodynamically contoured to promote airflow through the fan 110.

The plurality of fan blades 113 are coupled to and uniformly spaced around the circumference of the fan disk 111. Each of the plurality of fan blades 113 comprises a fan blade root 115, at which the fan blade 113 is coupled to the fan disk 111, and a fan blade tip 117 disposed opposite the fan blade root 115. The fan blade root 115 is oriented radially inwards towards the central longitudinal axis 101, while the fan blade tip 117 is oriented radially outward away from the central longitudinal axis 101. The distance between the fan blade root 115 and the fan blade tip 117 defines a span or a length of the fan blade 113.

In some examples, the number ($N_b$) of fan blades 113 can desirably be between 14 and 26 fan blades. In other examples, the plurality of fan blades 113 can number between 20 and 24 fan blades, 20 and 22 fan blades, or 22 fan blades.

Characteristics of the fan 110 include the fan pressure ratio ("FPR"). FPR is defined as the ratio of the pressure of the air entering fan 110 from an upstream direction to the pressure of the air exiting the fan 110 in a downstream direction. In some examples, the FPR of the gas turbine engine 100 can be greater than or equal to 1.04 and less than or equal to 1.45. In other examples, the FPR can be greater than 1.04 and less than 1.40. In other examples, the FPR can be 1.04 to 1.20, or in some embodiments 1.05 to 1.1, or in some embodiments less than 1.08, as measured across the fan blades at a cruise flight condition.

During operation, the core turbine engine 103 generates mechanical energy for rotating the fan 110. The core turbine engine 103, disposed aft of the fan 110, includes a compressor section 120, a combustion section 130, a turbine section 140, a drive shaft system 150, a gearbox assembly 160, and a nozzle section 170. However, other examples of the gas turbine engine 100 can comprise additional or alternative components.

During operation, the compressor section 120 compresses or increases the pressure of the air 105 propelled into the core turbine engine 103 by the fan 110. The compressor section 120 is typically the forward-most component of the core turbine engine 103 and thus can be disposed directly aft of the fan 110. In some examples, the compressor section 120 comprises one or more stages of a low-pressure compressor and one or more stages of a high-pressure compressor.

The combustion section 130, which is disposed aft of the compressor section 120, combusts the air pressurized by the compressor section 120 with fuel to produce combustion gases.

During operation, the turbine section 140 generates power by extracting thermal and kinetic energy from the combustion gases produced by the combustion section 130. The turbine section 140 produces power in any suitable range sufficient to power the fan 110. The turbine section 140 comprises a high pressure turbine 141 and a low pressure turbine 143. The high pressure turbine 141, disposed aft of the combustion section 130, extracts energy from the combustion gases leaving the combustion section 130. The low pressure turbine 143 is disposed aft of the high pressure turbine 141 and extracts energy from combustion gases leaving the high pressure turbine 141.

In some examples, the low pressure turbine 143 can comprise a plurality of low pressure turbine stages 144, 145, 146, 147. In the illustrated example, the low pressure turbine 143 can be a four-stage low pressure turbine comprising, from fore to aft, a first low pressure turbine stage 144, a second low pressure turbine stage 145, a third low pressure turbine stage 146, and a fourth low pressure turbine stage 147. In some examples, the low pressure turbine comprises three or more stages, such as three stages, four stages, or five stages. Including additional low pressure turbine stages can desirably increase the amount of work extracted from the combustion gases and in some examples, the low pressure turbine comprises four or more stages, such as four stages or five stages.

The drive shaft system 150 can include a high pressure shaft system that couples the high pressure turbine 141 to the compressor section 120 and a low pressure shaft system connecting the low pressure turbine 143 to the fan 110, thereby allowing the turbine section 140 to power the fan 110 and the compressor section 120. In some examples, the drive shaft system 150 can couple the high pressure turbine 141 to the high pressure compressor (not pictured) and can couple the low pressure turbine 143 to the low pressure compressor (not pictured) and the fan 110. In some examples, the drive shaft system 150 can comprise a plurality of concentric shafts configured to rotate about and extending along the central longitudinal axis 101 (also referred to herein as the engine centerline).

The gearbox assembly 160 couples the turbine section 140 to the fan 110. In some examples, the gearbox assembly 160 can be configured to receive power from a plurality of sources. In some examples, the gearbox assembly 160 can be configured to receive power from each of the low pressure turbine stages 144, 145, 146, 147. The gearbox assembly 160 can be configured to drive or output the power to the fan 110, thereby allowing the low pressure turbine 143 and the fan 110 to rotate at their respective rotational speeds without affecting the operation of the other components. In some of these examples, the gearbox assembly 160 can comprise one or more epicyclic gearboxes or any other suitable gear train configured to couple the turbine section 140 to the fan 110.

The gearbox assembly 160 reduces the rotational speed of the output (to the fan) relative to the input (from the low pressure turbine). In some examples, a gear ratio of the gearbox assembly 160 can be 2-6. For example, the gear ratio can be 2-5, 2.5-4, 2-2.9, 3.2-4, or 3.25-3.75. In some examples, a gear ratio of the gearbox assembly can be greater than 4, such as 4.1-6.0 or 4.1-5.0.

Once the combustion gases have exited the turbine section 140, the combustion gases pass through the nozzle section 170 and exit the gas turbine engine 100. In some examples, the nozzle section can comprise two co-annular nozzles: a combustion nozzle 171 and a fan nozzle 173. The combustion nozzle 171 is the centermost co-annular nozzle configured to allow combustion gases to exit the core turbine engine 103. The fan nozzle 173 is the outermost co-annular nozzle configured to allow air to exit the bypass stream 109.

The fan case 180 houses or encloses the fan 110. The fan case 180 comprises a hollow shell 181, an inlet 183, a lip 185, an outlet 187, and an acoustic treatment 189. However, other examples of the fan case 180 can include additional or alternative components.

The hollow shell 181 protects and/or insulates the fan 110. The hollow shell 181 extends along the central longitudinal axis 101 from the inlet 183 to the outlet 187. The hollow shell 181 is sized to encompass the core turbine engine 103 fully (as shown), or partially such that the inlet 183 is disposed forward of the fan 110 and the outlet 187 is disposed aft of the OGVs 190. The hollow shell 181 features a streamlined shape to improve aerodynamic performance. In some examples, the hollow shell 181 can be streamlined or tapered such that the inlet 183 or a forward end portion of the hollow shell 181 has a wider diameter than the outlet 187 or an aft end portion of the hollow shell 181.

During operation, the inlet 183 allows the passage of air into the gas turbine engine 100. The inlet 183 comprises a circular, forward-facing opening in the hollow shell 181 centered about the central longitudinal axis 101. In some examples, the inlet 183 can be angled relative to the central longitudinal axis 101 such that a top portion 183a of the inlet 183, i.e., a portion of the inlet 183 at a twelve o'clock position when the gas turbine engine 100 is mounted to an aircraft, extends forward of a bottom portion 183b of the inlet 183 at a six o'clock position, as shown.

The inlet 183 and the hollow shell 181 define a lip 185 extending along the circumference of the inlet 183 at the forward-most edge portion of the hollow shell 181. The lip 185 is contoured or curved to improve aerodynamic performance and/or reduce flow separation. For example, the lip 185 can be contoured such that the hollow shell 181 forms an hourglass shape (in cross-section) forward of the fan 110.

During operation, the outlet 187 allows air and combustion gases to exit the fan case 180. The outlet 187 comprises a circular, aft-facing opening in the hollow shell 181. The outlet 187 can be centered about and orthogonal to the central longitudinal axis 101 of the gas turbine engine 100.

The acoustic treatment 189 can be provided to acoustically insulate the fan case 180 during operation, thereby desirably reducing the amount of noise emitted by the gas turbine engine 100. The acoustic treatment 189 can comprise a multi-layered liner disposed on a circumferential interior surface of the hollow shell 181. When disposed on the circumferential interior surface of the hollow shell 181, the multi-layered liner can comprise a radially innermost porous layer, an intermediate partitioned layer, and a radially outermost impervious layer. In some examples, the acoustic treatment 189 is disposed on the portion of the interior surface of the hollow shell 181 extending between the fan 110 and the OGVs 190.

The OGVs 190 couple the fan case 180 to the core turbine engine 103 and steer the air 107 in the bypass stream 109 towards the fan nozzle 173 and the outlet 187. The OGVs 190 extend radially outwards to the circumferential interior surface of the hollow shell 181 of the fan case 180, and can be disposed in a radially uniform fashion around the circumference of the core turbine engine 103. In some examples, the OGVs 190 can be swept such that a tip or a radially outward end portion of each of the OGVs 190 is angled towards the aft end of the gas turbine engine 100.

In some examples, each of the OGVs comprises a serrated leading edge 191. The serrated leading edge 191 can comprise a waveform or a serration extending radially along the edge of each of the OGVs 190. The waves or serrations are configured to reduce the noise generated by the air in the bypass stream 109 passing over the OGVs 190.

The example gas turbine engine 100 depicted in FIG. 1 should not be construed to preclude other suitable configurations of gas turbine engines. It should also be appreciated that aspects of the present disclosure can be incorporated into other suitable gas turbine engines used in aircraft.

Figure 2:
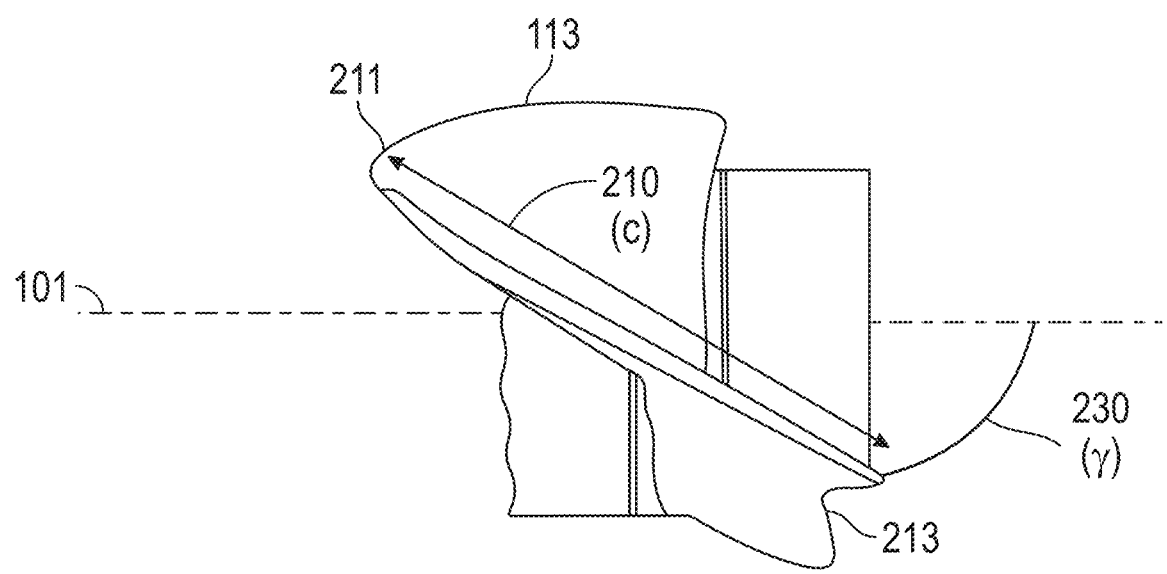
FIG. 2 shows a top view of a fan blade for a gas turbine engine, according to one example.
Figure 3:
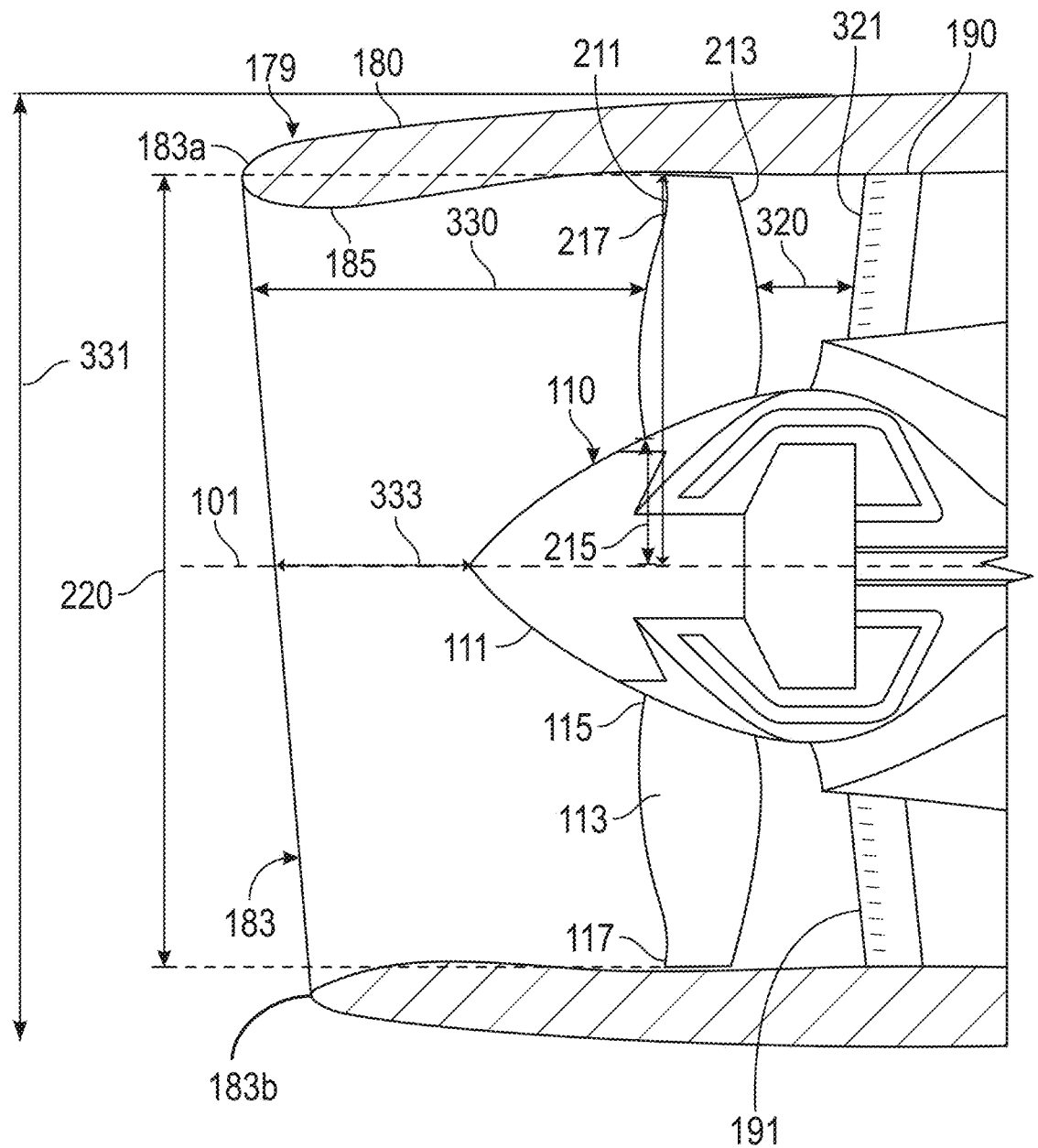
FIG. 3 is a partial view of a gas turbine engine with an acoustic spacing, according to one example.

FIG. 2 shows a top view of a fan blade 113 and FIG. 3 shows a view of the fan 110. Each of the fan blades 113 have a blade solidity (c/s). Each fan blade has a radial span extending from a root at a 0% span position to a tip at a 100% span position. The span S of a blade is the difference in the radius of a leading edge at the tip 217 and the radius of the leading edge of the root at the hub 215.

Blade solidity is defined as the ratio of chord length (c) 210 to the circumferential spacing(s) between the fan blade 113 and a nearest adjacent fan blade 113, measured at a 75% span position of the fan blade 113. As shown in FIG. 2, the chord length 210 is a straight-line distance between a leading edge 211 and a trailing edge 213 of the fan blade. The spacing(s) between adjacent fan blades is calculated by multiplying a fan diameter by π and dividing the product by the number ($N_b$) of fan blades. In a first set of examples, enhanced performance can be observed when the blade solidity of the gas turbine engine is greater than or equal to 0.8 and less than or equal to 2. In a second set of examples, enhanced performance can be observed when the blade solidity is greater than or equal to 0.8 and less than or equal to 1.5. In a third set of examples, enhanced performance can be observed when the blade solidity is greater than or equal to 1 and less than or equal to 2. In a fourth set of examples, enhanced performance can be observed when the blade solidity is greater than or equal to 1.25 and less than or equal to 1.75.

In addition, the fan preferably has a low radius ratio (rr), which is a ratio of the radius of the leading edge of the root at the hub 215 to the radius 217 of a blade tip or 100% span position of a blade, both measured from the central longitudinal axis 101 at the leading edge 211 of fan blades as shown in FIG. 3. In some examples, the radius ratio (rr) is 0.2 to 0.35, in other examples, the radius ratio (rr) is 0.25 to 0.3.

Each of the plurality of fan blades 113 defines a stagger angle (y) 230. The stagger angle 230 is an angle between the central longitudinal axis 101 and a chord line (along which the chord length is measured) as measured at the 75% span position of the respective fan blade. In some examples, the stagger angle 230 can range from 30 degrees to 75 degrees. In other examples, the stagger angle 230 can range from 30 degrees to 60 degrees.

As discussed above, the inventors, during the course of engine design, sought to improve engine performance characteristics including thrust efficiency, installation, engine length from inlet to nozzle, fan case and core size (affecting installed drag) and staying within a maximum weight budget. In one example, the OGVs were mounted to a fan frame, along with the fan and the gearbox assembly. This meant that the OGVs would be located relatively close to the fan so that a more compact engine and efficient (strength/weight) load bearing fan frame could be realized. But the resulting proximity of the fan to the OGVs was found to generate more noise than desired. From an acoustics standpoint, one instead wants to space the fan and the OGVs further apart from each other, generally speaking. But this change can impact the placement of other subsystems and adversely affect overall performance, e.g., gearbox assembly placement and resulting load balances associated with the fan frame, fan frame length, overturning moments, and overall weight of a nacelle, either the fan case type illustrated in FIG. 1 or an engine with a short fan case, such as the engines illustrated in FIGS. 3 and 4, and described in paragraphs [0083]-[0092] of U.S. Patent Application Publication No. 2022/0042461, which have a fan nozzle terminating well upstream of the core nozzle located downstream of the low pressure turbine. As each change impacts other systems, there is a need to understand what combination, or extent of modifications, provide improved acoustic performance without unacceptably negatively impacting other aspects of the engine architecture, as mentioned. Thus, it was exceedingly more challenging to determine how to implement changes without affecting other aspects of the architecture upon which increased performance was dependent upon, than simply making modifications to reduce the noise generated.

Taking these things in mind, the inventors unexpectedly discovered that gas turbine engines, such as the gas turbine engine 100 of FIG. 1, embodying the below-described characteristics have improved acoustic characteristics, but without imposing severe and unacceptable penalties on other aspects of the architecture or engine aero-performance. For example, the inventors found that gas turbine engines with desirable placement of OGVs, such as the OGVs 190 of FIG. 1, may result in the maintaining of or improving upon a desired propulsive efficiency, while improving the turbofan engine's acoustic properties.

FIG. 3 is a schematic, partial cross-sectional view of a gas turbine engine in accordance with the disclosure. For gas turbine engines that have a blade solidity greater than or equal to 0.8 and less than or equal to 2, it has been found that such engines are characterized by a blade effective acoustic length (BEAL) that can be used, as explained below, to determine a range of modifications and/or adjustments that provide improved acoustic performance. The BEAL is determined from (1) below:

$$BEAL = \frac{2c^2}{S(1-rr)N_b}\cos(\gamma) \quad (1)$$

where c is the chord length at 75% span, rr is the radius ratio of the fan, S is the full span of the fan blade (i.e., as measured at a 100% span position at the blade leading edge), y is the stagger angle, and $N_b$ is the number of fan blades.

Exemplary ranges for the elements of the gas turbine engines described herein are provided below in Table 1. As shown in Table 1, for some variables, the exemplary ranges vary depending on a corresponding range of fan blade diameter. For example, the fan blade diameter (FBD) for three different ranges, FBD #1, FBD #2, and FBD #3 are shown below.

65≤FBD #1<80 inches
80≤FBD #2<95 inches
95≤FBD #3<115 inches

TABLE 1

| Symbol | Description | Exemplary Ranges for Use with BEAL |
|---|---|---|
| C | Chord length at 75% span position (ranges based on FBD) | 5" to 28" (for FBD#1)<br>6" to 33" (for FBD#2)<br>7" to 35" (for FBD#3) |
| S | Span of fan blade at 100% span position (ranges based on FBD) | 24" to 30" (for FBD#1)<br>28" to 36" (for FBD#2)<br>32" to 40" (for FBD#3) |
| rr | Radius ratio (range) | 0.2 to 0.35 |
| Nv | Number of OGVs (ranges) | 1.5 Nb to 3 Nb,<br>1.8 Nb to 2.4 Nb,<br>2.0 Nb to 2.5 Nb, or<br>2.2 Nb to 2.6 Nb |
| y | Stagger angle (ranges) | 30°-75° or 30°-60° |
| $N_b$ | Number of fan blades (ranges) | 14-26, 20-24, 20-22, or 22 |

As shown in FIG. 3, an acoustic spacing 320 (As) is a length, measured parallel to the central longitudinal axis 101, that extends from the trailing edge 213 of the fan blade 113 to the leading edge 321 of a corresponding one of the OGVs 190. An inlet length 330 is an axial distance between the leading edge 211 of a fan blade 113 and the inlet 183. The acoustic spacing 320, chord length 210 (FIG. 2), and inlet length 330 are measured at the 75% span position of the fan blade 113.

An acoustic spacing ratio (ASR) can be determined using the BEAL, ratio of Nv/Nb, and the acoustic spacing (As) as shown below in (2):

$$ASR = \frac{1}{\left(\frac{Nv}{Nb}\right)} \cdot \frac{As}{BEAL} \quad (2)$$

Nv is the number of vanes of the OGVs. In certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan. In some examples, the number of OGVs (Nv) are at least twice the number of fan blades ($N_b$). In some examples, a ratio of the number of OGVs to the number of fan blades (Nv/$N_b$) is 2.0 to 2.5, or 2.2 to 2.6. In other examples, the ratio of the number of OGVs to the number of fan blades (Nv/$N_b$) is 1.5 to 3.0 or 1.8 to 2.4. In other embodiments, a ratio of vanes to blades can be less than 1:1. For example, in particular embodiments, the engine includes twelve (12) fan blades and ten (10) vanes.

Varying the acoustic spacing ratio can impact engine performance in the following ways. For example, gas turbine engines with higher acoustic spacing ratios can emit less noise. And gas turbine engines with lower acoustic spacing ratios can reduce the size of the gas turbine engines, thereby beneficially reducing fuel consumption and emissions generated by the gas turbine engines.

Gas turbine engines with acoustic spacing ratios from 1.4 to 3.2 exhibited the sought-after balance (discussed above) between noise emissions and engine size, thereby featuring enhanced performance over conventional gas turbine engines. For example, enhanced results can be achieved with acoustic spacing ratios from 1.5 to 16, including the lower ratios such as 1.5 to 3.1 or 1.6 to 3, 1.6 to 2.4 or 2.0 to 3, and higher ratios such as 4 to 14 or 6.6 to 13.5, depending on a desired acoustic spacing and fan blade design.

As shown in FIGS. 1 and 3, the axial extent of the inlet 183 can vary, e.g., between a twelve o'clock position and a six o'clock position. For this type of fan case 180, the inlet length 330 is the average the axial distance between the leading edge 211 of the fan blade 113 and the top portion 183a of the inlet 183, and the axial distance between the leading edge 211 the fan blades 113 and the bottom portion 183b of the inlet 183, i.e., the inlet length 330 is distance from the leading edge 211 of the fan blade 113 and the inlet 183, as measured at the 75% span position of the fan blade 113.

In one set of examples, the fan diameter 220 ranges from 52 in. to 120 in. In another set of examples, the fan diameter 220 ranges from 75 in. to 105 in. In additional sets of examples, the fan diameter 220 ranges from 70 in. to 80 in, 80 in. to 95 in., or 95 in. to 105 in. An inlet length ratio is the ratio of the inlet length 330 to the fan diameter 220. Enhanced performance of gas turbine engines 100 can be achieved with inlet length ratios from 0.15 to 0.5. Gas turbine engines 100 with inlet length ratios less than or equal to 0.5 can desirably feature enhanced performance compared to conventional gas turbine engines 100 due to reduced fan case length, reduced drag, and reduced fan distortion. In another set of examples, enhanced performance can unexpectedly be achieved with inlet length ratios from 0.15 to 0.4. In further examples, enhanced performance can be achieved with inlet length ratios from 0.15 to 0.3.

In another set of examples, an inlet-to-nacelle (ITN) ratio is defined as a ratio of the inlet length 330 to a nacelle outer diameter 331, which is the largest diameter of the nacelle 179. Enhanced performance of gas turbine engines 100 can be achieved with ITN ratios from 0.23 to 0.35. Gas turbine engines 100 with ITN ratios can desirably feature enhanced performance compared to conventional gas turbine engines 100 due to reduced fan case length, reduced drag, and reduced fan distortion. In another set of examples, enhanced performance can unexpectedly be achieved with ITN ratios from 0.27 to 0.35, and from 0.30 to 0.33.

FIG. 3 illustrates a disk spacing length 333, which is the distance between a forwardmost end of the fan disk 111 and the intersection of the inlet taken along the engine centerline (i.e., central longitudinal axis 101). A disk-to-blade diametric (DBD) ratio is the ratio of the disk spacing length 333 to the fan diameter 220. The inventors of the present disclosure have found that enhanced performance of gas turbine engines 100 can be achieved with disk-to-blade diametric ratios that are less than or equal to 0.6, and in some examples with disk-to-blade diametric ratios that range from 0.09 to 0.59, 0.15 to 0.35, and 0.19 to 0.27. Gas turbine engines 100 with disk-to-blade diametric ratios in these ranges can desirably feature enhanced performance compared to conventional gas turbine engines 100 due to reduced drag and reduced fan distortion. Further benefits have been identified when a gas turbine engine is configured to have a DBD ratio in the ranges disclosed above, in combination with an ITN ratio in the ranges disclosed above. For example, a gas turbine engine can have a DBD ratio of 0.22 and an ITN ratio of 0.27, both of which meet at least one of the stated desirable ranges for the DBD and ITN ratios. It should be noted that a gas turbine engine can be configured to meet any combination of the disclosed DBD ratios and the disclosed ITN ratios.

In another set of examples, enhanced performance can unexpectedly be achieved with disk-to-nacelle ratios below 0.47. A disk-to-nacelle diametric (DND) ratio is the ratio of the disk spacing length 333 to the nacelle diameter 331. The inventors of the present disclosure have found that enhanced performance of gas turbine engines 100 can be achieved with disk-to-nacelle diametric ratios that range from 0.07 to 0.47, 0.15 to 0.35, and 0.19 to 0.27. Gas turbine engines 100 with disk-to-nacelle diametric ratios in these ranges can desirably feature enhanced performance compared to conventional gas turbine engines 100 due to reduced drag and reduced fan distortion. Further benefits have been identified when a gas turbine engine is configured to have a DND ratio in the ranges disclosed above, in combination with an ITN ratio in the ranges disclosed above. For example, a gas turbine engine can have a DND ratio of 0.21 and an ITN ratio of 0.27, both of which meet at least one of the stated desirable ranges for the DND and ITN ratios. It should be noted that a gas turbine engine can be configured to meet any combination of the disclosed DND ratios and the disclosed ITN ratios.

In another set of examples, enhanced performance can unexpectedly be achieved with disk-to-inlet length (DIL) ratios within the range 0.30 to 0.80. A disk-to-inlet ratio is the ratio of the disk spacing length 333 to the inlet length 330. The inventors of the present disclosure have found that enhanced performance of gas turbine engines 100 can be also be achieved with disk-to-inlet ratios that range from 0.4 to 0.8, 0.4 to 0.7, and 0.45 to 0.67. Gas turbine engines 100 with disk-to-inlet ratios in these ranges can desirably feature enhanced performance compared to conventional gas turbine engines 100 due to reduced drag and reduced fan distortion. Further benefits have been identified when a gas turbine engine is configured to have a DIL ratio in the ranges disclosed above, in combination with an ITN ratio in the ranges disclosed above. For example, a gas turbine engine can have a DIL ratio of 0.49 and an ITN ratio of 0.27, both of which meet at least one of the stated desirable ranges for the DIL and ITN ratios. It should be noted that a gas turbine engine can be configured to meet any combination of the disclosed DIL ratios and the disclosed ITN ratios.

Table 2 below illustrates exemplary engines with the disk-to-blade diametric (DBD) ratios, disk-to-nacelle diametric (DND) ratios, and disk-to-inlet (DIL) ratios in the ranges disclosed herein. For each exemplary gas turbine engine disclosed in Table 2, the gas turbine engine has an ITN ratio that is 0.23 to 0.35.

TABLE 2

| Engine | fan-disk spacing length (in) 333 | fan diameter (in) 220 | nacelle diameter (in) 331 | inlet length (in) 330 | DBD Ratio | DND Ratio | DIL Ratio |
|---|---|---|---|---|---|---|---|
| 1 | 24 | 46 | 64 | 36 | 0.52 | 0.38 | 0.67 |
| 2 | 26 | 53 | 75 | 37 | 0.49 | 0.35 | 0.70 |
| 3 | 35 | 61 | 87 | 48 | 0.57 | 0.40 | 0.73 |
| 4 | 24 | 69 | 96 | 37 | 0.35 | 0.25 | 0.65 |
| 5 | 21 | 78 | 102 | 37 | 0.27 | 0.21 | 0.57 |
| 6 | 22 | 78 | 104 | 39 | 0.28 | 0.21 | 0.56 |
| 7 | 48 | 93 | 115 | 63 | 0.52 | 0.42 | 0.76 |
| 8 | 17 | 88 | 116 | 35 | 0.19 | 0.15 | 0.49 |
| 9 | 21 | 80 | 107 | 32 | 0.26 | 0.20 | 0.66 |
| 10 | 10 | 115 | 135 | 33 | 0.09 | 0.07 | 0.30 |
| 11 | 36 | 61 | 77 | 45 | 0.59 | 0.47 | 0.80 |

FIG. 4 discloses acoustic spacing ratios for exemplary gas turbine engines as described herein. Engines #1, 2, 4, 5, and 19 illustrate exemplary engines with fan blades having fan diameters in the FBD #1 range, Engines #3, 6, 7, 8, 13, 14, 15, 17, 18, 20, 21, and 22 illustrate exemplary engines with fan blades having fan diameters in the FBD #2 range, and Engines #9, 10, 11, 12, and 16 illustrate exemplary engines with fan blades having fan diameters in the FBD #3 range. In each of the exemplary engines, the ASR is in the range of 1.5 to 16.0.

As noted above, the ASR can be in the range of 1.5 to 16.0, or as shown in FIG. 4, in ranges from 1.5 to 4.1, 1.5 to 3.1, 1.6 to 3, 1.6 to 2.4 or 2.0 to 3, and, depending on the desired fan blade selection, higher ratios such as 4 to 14, 6.6 to 13.5, or 6.5-10.2.

In some embodiments, it was additionally found that the acoustic performance can be further improved without negatively affecting other aspects of performance by using composite fan blades to enable a higher bypass ratio. A higher bypass ratio can reduce noise generation, thereby improving acoustic performance, by reducing the fan pressure ratio of the fan (e.g., from 1.5 to 1.4, or 1.35), and operating within the defined ranges for BEAL and ASR, as discussed above. Some embodiments include turbomachines with bypass ratios of 10:1 to 20:1, or 10:17:1, or, in other examples from 12:1 to 15:1, where bypass ratio is defined as the ratio of air passing through the fan case that bypasses the inlet to the engine core, to the air that enters the engine core, at a takeoff condition. For the higher bypass ratios in this range, it was found that composite blades, operating in the defined BEAL and ASR ranges, provide improved acoustic performance while also providing improved blade toughness when encountering flutter or foreign object impact that can result in blade loss.

In some embodiments, the fan blades comprise composite materials. For example, the fan blade can comprise fiber-reinforced composite materials that include a matrix and one or more plies with fibers. The fiber-reinforced composite material can be formed from a continuous wrap ply or from multiple individual plies. In some examples, the fiber-reinforced composite material can be formed with a plurality of fiber plies (or bands) interwoven in an in-plane and out-of-plane orientation by interleaving each of the plurality of fiber bands with one or more of the plurality of fiber bands previously laid down and not in a common plane to fill the one or more gaps and define a uniformly covered multi-layered assembly. The plurality of fiber bands can also be interwoven in three or more different orientation angles, as described in U.S. Pat. No. 9,249,530, which is incorporated by reference in its entirety herein. In some examples, the fibers can be woven in three dimensions as described in U.S. Pat. No. 7,101,154, which is incorporated by reference in its entirety herein.

The fiber types may be mixed within a given layer, ply or different plies may be formed using different fiber types. In one example, harder, shear resistant fibers may be incorporated at an impact surface, while the fiber near a back surface may be selected for enhanced energy absorption. Non-limiting examples of harder shear resistant fibers include metallic or ceramic fibers. Non-limiting examples of fibers with relatively high energy absorption include S-glass, aramid fibers (e.g., Kevlar® and Twaron®), as well as oriented polyethylene fibers, such as Spectra® and Dyneem®. Kevlar® is sold by E. I. du Pont de Nemours and Company, Richmond Va. Twaron® aramid fibers are sold by Tejin Twaron, the Netherlands. Spectra® fiber is sold by Honeywell Specialty Materials, Morris N.J. Dyneema® fiber is sold by Dutch State Mines (DSM), the Netherlands.

The inventors determined that benefits from controlling both the compression (FLTCF) and opening (FLTOR) of the fan blade geometry can be exploited without introducing noise penalties, i.e. interaction noise between the fan blades and the outlet guide vanes (OGVs). The designs disclosed herein and expressed in terms of the compression factor (FLTCF) best ensures that the fan blade geometry minimizes turbulence and flow separation at the trailing edge of the blades, while the designs disclosed herein and expressed in terms of the opening ratio (FLTOR) allow for improved airflow exiting the fan blades. These designs create a more uniform and streamlined airflow profile. When combined with designs intended to reduce noise generated from airflow interacting with rotating fan blades and OGVs, an architecture may be realized, which benefits from the combined teachings of FLTCF, FLTOR and BEAL/ASR.

The disclosed architectures for reducing noise generation can play an important role in ensuring the benefits of the FLTCF and FLTOR are achieved while complying with, e.g., community noise, requirements. Changing the fan blade materials and geometry introduces new aerodynamic characteristics that affect downstream airflow. For example, composite materials, while offering superior strength and durability, tend to result in thicker fan blades, which can alter the flow dynamics and increase the potential for noise and turbulence. Without accounting for the acoustic spacing parameters disclosed herein, these changes in blade characteristics could negate the benefits of the designs defined by FLTCF and FLTOR.

Figure 5:
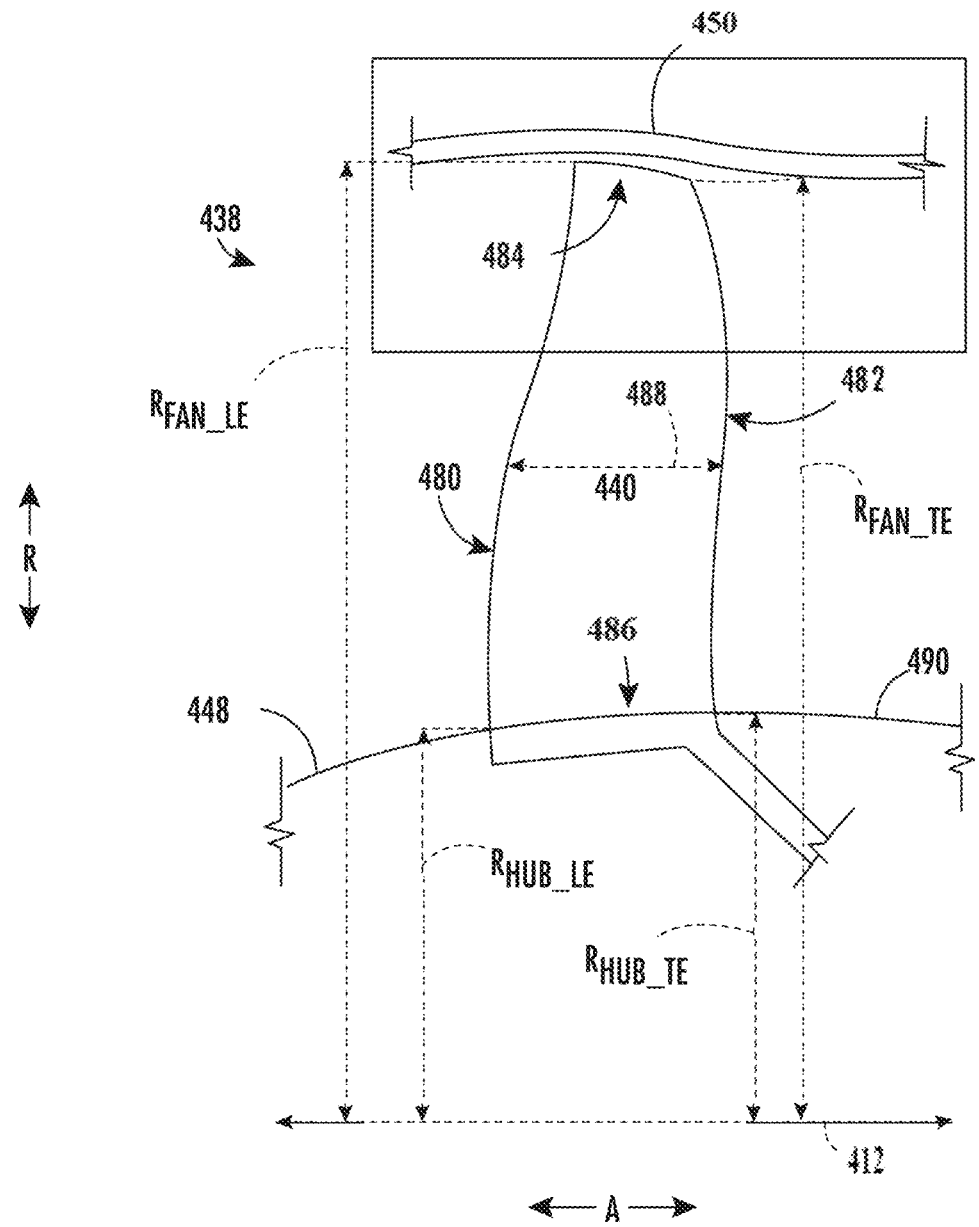
FIG. 5 is a close-up view of a blade of the gas turbine engine of FIG. 1 in accordance with an exemplary aspect of the present disclosure.

Referring now to FIG. 5, a close-up view of fan 438 is shown, specifically focusing on fan blade 440 of the gas turbine engine depicted in FIG. 1. The fan blade 440 features a leading edge 480 and a trailing edge 482 (see also leading edge 211 and trailing edge 213 in FIG. 2). Additionally, the fan blade 440 includes an outer tip 484 along the radial direction R, a base 486 along the radial direction R, and a chord 488 extending from the leading edge 480 to the trailing edge 482.

Further, it will be appreciated that the fan 438 defines a leading edge (LE) fan radius $R_{Fan\_LE}$ of the fan blade 440, a trailing edge (TE) fan radius $R_{Fan\_TE}$ of the fan blade 440, a leading edge hub radius $R_{Hub\_LE}$ of the fan 438, and a trailing edge hub radius $R_{Hub\_TE}$ of the fan 438. The leading edge fan radius $R_{Fan\_LE}$ of the fan blade 440 is a measure along the radial direction R from the longitudinal centerline 412 of the gas turbine engine to the outer tip 484 of the fan blade 440 at the leading edge 480. The trailing edge fan radius $R_{Fan\_TE}$ of the fan blade 440 is a measure along the radial direction R from the longitudinal centerline 412 of the gas turbine engine to the outer tip 484 of the fan blade 440 at the trailing edge 482. The leading edge hub radius $R_{Hub\_LE}$ of the fan 438 is a measure along the radial direction R from the longitudinal centerline 412 of the gas turbine engine to the base 486 of the fan blade 440 at the leading edge 480 (where the leading edge 480 meets the spinner/front hub 448). The trailing edge hub radius $R_{Hub\_TE}$ of the fan 438 is a measure along the radial direction R from the longitudinal centerline 412 of the gas turbine engine to the base 486 of the fan blade 440 at the trailing edge 482 (where the trailing edge 482 meets a casing 490 defining in part an airflow path to receive airflow from the fan 438).

Further, it will be appreciated that the fan blade 440 (and each of the fan blades 440 of the fan 438) are formed of a composite material. It will be appreciated that as used herein, the phrase "formed of a composite material," with reference to the fan blades 440, refers to at least 80% by weight of the fan blades 440, between the base 486 and the outer tip 484, being formed of one or more composite materials.

A Fan Leading Edge to Trailing Edge Compression Factor (FLTCF), is expressed as:

$$FLTCF = \frac{R_{Fan_{LE}} \times R_{Hub_{TE}}}{R_{Fan_{TE}} \times R_{Hub_{LE}}}.$$

In the above expression of FLTCF, $R_{Fan\_LE}$ is a leading edge fan radius of a fan blade of a fan of a gas turbine engine, $R_{Fan\_TE}$ is a trailing edge fan radius of the fan blade of the fan of the gas turbine engine, $R_{Hub\_LE}$ is a leading edge hub radius of the fan of the gas turbine engine, and $R_{Hub\_TE}$ is a trailing edge hub radius of the fan of the gas turbine engine.

A Fan Leading Edge to Trailing Edge Opening Ratio (FLTOR), is expressed as:

$$FLTOR = \frac{R_{Fan_{LE}} - R_{Hub_{LE}}}{R_{Fan_{TE}} - R_{Hub_{TE}}}.$$

In the above expression of FLTOR, $R_{Fan\_LE}$ is a leading edge fan radius of a fan blade of a fan of a gas turbine engine, $R_{Fan\_TE}$ is a trailing edge fan radius of the fan blade of the fan of the gas turbine engine, $R_{Hub\_LE}$ is a leading edge hub radius of the fan of the gas turbine engine, and $R_{Hub\_TE}$ is a trailing edge hub radius of the fan of the gas turbine engine.

Example engines in accordance with one or more exemplary embodiments of the present disclosure are provided in Table 3.

TABLE 3

| # | RHUB_LE (IN) | RHUB_LT (IN) | RFAN_LE (IN) | RFAN_TE (IN) | Nb | Thrust Rating | FLTCF | FLTOR |
|---|---|---|---|---|---|---|---|---|
| 1 | 18 | 25 | 61 | 61 | 22 | 95000 | 1.41 | 1.22 |
| 2 | 20 | 26 | 64 | 62 | 22 | 115000 | 1.35 | 1.22 |
| 3 | 15 | 22 | 56 | 54 | 18 | 75000 | 1.45 | 1.24 |
| 4 | 15 | 21 | 52 | 51 | 18 | 66000 | 1.37 | 1.21 |
| 5 | 15 | 24 | 67 | 65 | 16 | 110000 | 1.60 | 1.26 |
| 6 | 11 | 15 | 44 | 44 | 22 | 35000 | 1.42 | 1.17 |
| 7 | 12 | 15 | 41 | 40 | 22 | 25000 | 1.26 | 1.13 |

The FLTCF is preferably greater than or equal to 1.05 and less than or equal to 1.8. For example, in certain exemplary embodiments, the FLTCF is greater than or equal to 1.07 and less than or equal to 1.65. Further, the FLTOR is greater than or equal to 1.03 and less than or equal to 1.5. For example, in certain exemplary embodiments, the FLTOR is greater than or equal to 1.05 and less than or equal to 1.3, greater than or equal to 1.12 and less than or equal to 1.27. In addition, each engine in Table 3 has an ASR in the range of 1.5 to 16.0.

The exemplary engines noted in Table 3 each defines a bypass ratio greater than or equal to 10 and less than or equal to 20, such as greater than or equal to 10 and less than or equal to 17. Further, each of the exemplary engines noted in FIG. 6 includes a reduction gearbox (and thus may be referred to as a geared gas turbine engine) defining a gear ratio greater than or equal to 2 and less than or equal to 6.

Further for example, in another exemplary embodiment, the gas turbine engine is a ducted gas turbine engine including an outer nacelle surrounding at least in part a fan of the gas turbine engine, with the fan having fan blades formed of a composite material (see, e.g., the embodiment of FIG. 1, described above). In such an exemplary embodiment, a leading edge fan radius $R_{Fan\_LE}$ of a fan blade of the fan is greater than or equal to 35 inches and less than or equal to 50 inches, the fan defines a fan blade count greater than or equal to 12 and less than or equal to 23, a reduction gearbox defines a gear ratio greater than 2 and less than 4, and a thrust rating for the engine is between 20,000 pounds and 45,000 pounds. With such an exemplary embodiment the FLTCF is greater than or equal to 1.12 and less than or equal to 1.35, and the FLTOR is greater than or equal to 1.06 and less than or equal to 1.19. In such a manner, it will be appreciated that forming the fan blades of a composite material with this exemplary gas turbine engine enabled a size of the fan (e.g., in a chordwise direction) to be increased, allowing for a desired thrust output, despite a potential reduction in the fan blade count of the fan and solidity of the fan blades. Example 7 is an exemplary embodiment of such a gas turbine engine.

For example, in yet another exemplary embodiment, the gas turbine engine is a ducted gas turbine engine including an outer nacelle surrounding at least in part a fan of the gas turbine engine, with the fan having fan blades formed of a composite material. In such an exemplary embodiment, a leading edge fan radius $R_{Fan\_LE}$ of a fan blade of the fan is greater than or equal to 51 inches and less than or equal to 66 inches, the fan defines a fan blade count greater than or equal to 17 and less than or equal to 23, a reduction gearbox defines a gear ratio greater than 1 and less than 4, and a thrust rating for the engine is between 60,000 pounds and 118,000 pounds. With such an exemplary embodiment the FLTCF is greater than or equal to 1.27 and less than or equal to 1.5, and the FLTOR is greater than or equal to 1.18 and less than or equal to 1.25. In such a manner, it will be appreciated that forming the fan blades of a composite material with this exemplary gas turbine engine enabled a size of the fan (e.g., in a radial direction and in a chordwise direction) to be increased, allowing for a desired thrust output, despite a potential reduction in the fan blade count of the fan and solidity of the fan blades. Examples 1 through 4 are exemplary embodiments of such a gas turbine engine.

Further for example, in still another exemplary embodiment, the gas turbine engine is a ducted gas turbine engine including an outer nacelle surrounding at least in part a fan of the gas turbine engine, with the fan having fan blades formed of a composite material (see, e.g., the embodiment of FIGS. 1 and 2, described above). In such an exemplary embodiment, a leading edge fan radius $R_{Fan\_LE}$ of a fan blade of the fan is greater than or equal to 55 inches and less than or equal to 70 inches, the fan defines a fan blade count greater than or equal to 12 and less than or equal to 22 (e.g., less than or equal to 19), a reduction gearbox defines a gear ratio greater than 1 and less than 4, and a thrust rating for the engine is between 100,000 pounds and 150,000 pounds (such as greater than 118,000 pounds and less than 150,000 pounds). With such an exemplary embodiment the FLTCF is greater than or equal to 1.46 and less than or equal to 1.65, and the FLTOR is greater than or equal to 1.2 and less than or equal to 1.5 (such as greater than or equal to 1.25 and less than 1.5). In such a manner, it will be appreciated that forming the fan blades of a composite material have enabled a size of the fan (e.g., in a radial direction and in a chordwise direction) to be increased, allowing for a desired thrust output, despite a potential reduction in the fan blade count of the fan and solidity of the fan blades. Example 5 in is an exemplary embodiments of such a gas turbine engine.

In various embodiments, an engine of the present disclosure is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 pounds per square inch absolute (psia) and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 8 to 15 stages, a high-pressure turbine may include 1 to 2 stages, and/or a low pressure turbine (LPT) may include 3 to 7 stages. In particular, the LPT may have 4 stages, or between 4 and 7 stages. For example, in certain embodiments, an engine may include a one stage low pressure compressor, an 11 stage high pressure compressor, a two stage high pressure turbine, and 4 stages, or between 4 and 7 stages for the LPT. As another example, an engine can include a three stage low-pressure compressor, a 10 stage high pressure compressor, a two stage high pressure turbine, and a 7 stage low pressure turbine.

In view of the above-described implementations of the disclosed subject matter, this application discloses the additional examples enumerated below. It should be noted that one feature of an example in isolation or more than one feature of the example taken in combination and, optionally, in combination with one or more features of one or more further examples are further examples also falling within the disclosure of this application.

A gas turbine engine comprising: a core turbine engine comprising a low pressure turbine; a gearbox assembly coupled to the low pressure turbine; a fan coupled to the gearbox assembly and having a fan diameter and a plurality of fan blades formed of a composite material, the fan blade defining a leading edge fan radius $R_{Fan\_LE}$ and a trailing edge fan radius $R_{Fan\_TE}$, and the fan defining a leading edge hub radius $R_{Hub\_LE}$ and a trailing edge hub radius $R_{Hub\_TE}$, the gas turbine engine defining a bypass ratio equal to a mass flowrate of an airflow from the fan over the turbomachine to a mass flowrate of an airflow from the fan through the inlet to the working gas flowpath during operation of the gas turbine engine in a cruise operating mode, the bypass ratio being greater than or equal to 10 and less than or equal to 30; a blade effective acoustic length (BEAL) defined as:

$$BEAL = \frac{2c^2}{S(1-rr)N_b}\cos(\gamma)$$

wherein c is the chord length of a fan blade of the plurality of fan blades, S is a span of the fan blade, rr is a radius ratio of the fan, y is the stagger angle of the fan blade, and $N_b$ is the number of the plurality of fan blades; a nacelle that includes a fan case that surrounds the fan; a plurality of outlet guide vanes disposed aft of the fan and extending radially between the core turbine engine and the fan case; an acoustic spacing from the fan blade trailing edge to an outlet guide vane leading edge; an acoustic spacing ratio (ASR) defined as:

$$ASR = \frac{1}{\left(\frac{Nv}{Nb}\right)} \cdot \frac{As}{BEAL}$$

wherein As is the acoustic spacing and Nv is the number of the plurality of outlet guide vanes, and wherein the ASR of the gas turbine engine is 1.5 to 16.0, and wherein the gas turbine engine defines a Fan Leading Edge to Trailing Edge Compression Factor (FLTCF) greater than or equal to 1.05 and less than or equal to 1.8, the FLTCF being equal to:

$$\frac{R_{Fan_{LE}} \times R_{Hub_{TE}}}{R_{Fan_{TE}} \times R_{Hub_{LE}}}.$$

The gas turbine engine of any preceding clause, wherein the fan case comprises an inlet disposed forward of the fan and an inlet length, wherein the inlet length is an axial distance between the leading edge of one of the plurality of fan blades and the inlet to the fan, as measured at a 75% span position of the fan blade, and an inlet-to-nacelle (ITN) ratio is defined as a ratio of the inlet length to a maximum diameter of the nacelle, the ITN ratio is 0.23 to 0.35.

The gas turbine engine of any preceding clause, wherein the fan blades have a blade solidity that is greater than or equal to 0.8 and less than or equal to 2.0

The gas turbine engine of any preceding clause, wherein the FLTCF is greater than or equal to 1.07 and less than or equal to 1.65.

The gas turbine engine of any preceding clause, wherein the bypass ratio is greater than or equal to 10 and less than or equal to 20.

The gas turbine engine of any preceding clause, wherein the turbomachine comprises a compressor section having a low pressure compressor and a high pressure compressor, wherein the low pressure compressor is rotatable with the low pressure turbine.

The gas turbine engine of any preceding clause, wherein the leading edge fan radius $R_{Fan\_LE}$ is greater than or equal to 35 inches and less than or equal to 50 inches, wherein the fan defines a fan blade count greater than or equal to 12 and less than or equal to 23, and wherein the reduction gearbox defines a gear ratio between 2:1 and 4:1.

The gas turbine engine of any preceding clause, wherein the FLTCF is greater than or equal to 1.12 and less than or equal to 1.35.

The gas turbine engine of any preceding clause, wherein the gas turbine engine defines a Fan Leading Edge to Trailing Edge Opening Ratio (FLTOR) greater than or equal to 1.03 and less than or equal to 1.5, the FLTOR being equal to:

$$\frac{R_{Fan_{LE}} - R_{Hub_{LE}}}{R_{Fan_{TE}} - R_{Hub_{TE}}}.$$

The gas turbine engine of any preceding clause, also including a disk-to-blade diametric (DBD) ratio defined as a ratio of a disk spacing length to the fan diameter, the disk spacing length being a distance between a forwardmost end of a fan disk and an intersection with the inlet taken along an engine centerline, wherein the DBD ratio of the gas turbine engine is 0.09 to 0.59, 0.15 to 0.35, or 0.19 to 0.27.

The gas turbine engine of any preceding clause, also including a disk-to-nacelle diametric (DND) ratio defined as a ratio of a disk spacing length to the fan diameter, the disk spacing length being a distance between a forwardmost end of a fan disk and an intersection with the inlet taken along an engine centerline, wherein the DND ratio of the gas turbine engine is 0.07 to 0.47, 0.15 to 0.35, or 0.15 to 0.25.

The gas turbine engine of any preceding clause, also including a disk-to-inlet length (DIL) ratio defined as a ratio of a disk spacing length to the inlet length, the disk spacing length being a distance between a forwardmost end of a fan disk and an intersection with the inlet taken along an engine centerline, wherein the DIL ratio of the gas turbine engine is 0.30 to 0.80, 0.3 to 0.70, or 0.49 to 0.65.

The gas turbine engine of any preceding clause, further comprising a fan pressure ratio from 1.25 to 1.45.

The gas turbine engine of any preceding clause, further comprising an inlet length ratio that is a ratio of an inlet length to a diameter of the fan blade, wherein the inlet length defines an average distance from a leading edge of the fan blade to an inlet of the fan, and wherein the inlet length ratio is 0.15 to 0.4, or 0.15 to 0.3.

The gas turbine engine of any preceding clause, wherein the fan case further comprises an acoustic treatment disposed on an interior surface of the fan case, and, optionally, the acoustic treatment length is 50% to 90% of an inlet length.

The gas turbine engine of any preceding clause, wherein the number of the plurality of outlet guide vanes is at least twice the number of the plurality of fan blades.

The gas turbine engine of any preceding clause, wherein the low pressure turbine comprises at least three low pressure turbine stages or at least four low pressure turbine stages.

The gas turbine engine of any preceding clause, wherein plurality of outlet guide vanes further comprise serrated leading edges.

The gas turbine engine of any preceding clause, wherein the plurality of fan blades comprise composite materials that include a matrix and a plurality of fiber plies.

The gas turbine engine of any preceding clause, wherein the plurality of fiber plies are interwoven in in-plane and out-of-plane orientations, and/or the plurality of fiber plies are interwoven in three or more different orientation angles.

The gas turbine engine of any preceding clause, wherein a fan blade diameter of the fan blade is 65-80 inches, 80-95 inches, or 95-115 inches.

The gas turbine engine of any preceding clause, wherein the number of the plurality of fan blades is 14-26, 20-24, or 20-22.

The gas turbine engine of any preceding clause, wherein the blade solidity is 0.8 to 1.5, 1.0 to 2.0, or 1.25 to 1.75.

The gas turbine engine of any preceding clause, wherein the gas turbine engine has a bypass ratio of 10:1 to 17:1 or 12:1 to 15:1.

A gas turbine engine defining a radial direction, the gas turbine engine comprising: a turbomachine comprising a drive turbine and defining a working gas flowpath and an inlet to the working gas flowpath; a fan having a fan blade formed of a composite material, the fan blade defining a leading edge fan radius $R_{Fan\_LE}$ and a trailing edge fan radius $R_{Fan\_TE}$, and the fan defining a leading edge hub radius $R_{Hub\_LE}$ and a trailing edge hub radius $R_{Hub\_TE}$, the gas turbine engine defining a bypass ratio equal to a mass flowrate of an airflow from the fan over the turbomachine to a mass flowrate of an airflow from the fan through the inlet to the working gas flowpath during operation of the gas turbine engine in a cruise operating mode, the bypass ratio being greater than or equal to 10 and less than or equal to 30; and a reduction gearbox mechanically coupling the drive turbine of the turbomachine to the fan; wherein the gas turbine engine defines a Fan Leading Edge to Trailing Edge Opening Ratio (FLTOR) greater than or equal to 1.03 and less than or equal to 1.5, the FLTOR being equal to:

$$\frac{R_{Fan_{LE}} - R_{Hub_{LE}}}{R_{Fan_{TE}} - R_{Hub_{TE}}}.$$

The gas turbine engine of any preceding clause, wherein the FLTOR is greater than or equal to 1.12 and less than or equal to 1.27.

The gas turbine engine of any preceding clause, wherein the bypass ratio is greater than or equal to 10 and less than or equal to 20.

The gas turbine engine of any preceding clause, wherein the leading edge fan radius $R_{Fan\_LE}$ is greater than or equal to 35 inches and less than or equal to 50 inches, wherein the fan defines a fan blade count greater than or equal to 12 and less than or equal to 23, wherein the reduction gearbox defines a gear ratio between 2:1 and 4:1, and wherein the FLTOR is greater than or equal to 1.07 and less than or equal to 1.18.

The gas turbine engine of any preceding clause, wherein the gas turbine engine defines a Fan Leading Edge to Trailing Edge Compression Factor (FLTCF) greater than or equal to 1.05 and less than or equal to 1.8, the FLTCF being equal to:

$$\frac{R_{Fan_{LE}} \times R_{Hub_{TE}}}{R_{Fan_{TE}} \times R_{Hub_{LE}}}.$$

The gas turbine engine of any preceding clause, wherein the leading edge fan radius $R_{Fan\_LE}$ is greater than or equal to 35 inches and less than or equal to 50 inches, wherein the fan defines a fan blade count greater than or equal to 12 and less than or equal to 23, wherein the reduction gearbox defines a gear ratio greater than 2 and less than 4, wherein a thrust rating for the gas turbine engine is between 20,000 pounds and 45,000 pounds, wherein the FLTCF is greater than or equal to 1.12 and less than or equal to 1.35, and wherein the FLTOR is greater than or equal to 1.06 and less than or equal to 1.19.

The gas turbine engine of any preceding clause, wherein the leading edge fan radius $R_{Fan\_LE}$ is greater than or equal to 51 inches and less than or equal to 66 inches, wherein the fan defines a fan blade count greater than or equal to 17 and less than or equal to 23, wherein a thrust rating for the gas turbine engine is between 60,000 pounds and 118,000 pounds, wherein the FLTCF is greater than or equal to 1.27 and less than or equal to 1.5, and wherein the FLTOR is greater than or equal to 1.18 and less than or equal to 1.5.

The gas turbine engine of any preceding clause, wherein the leading edge fan radius $R_{Fan\_LE}$ is greater than or equal to 55 inches and less than or equal to 70 inches, wherein the fan defines a fan blade count greater than or equal to 12 and less than or equal to 22, wherein a thrust rating for the gas turbine engine is between 100,000 pounds and 150,000 pounds, wherein the FLTCF is greater than or equal to 1.46 and less than or equal to 1.65, and wherein the FLTOR is greater than or equal to 1.2 and less than or equal to 1.5.

In view of the many possible examples to which the principles of the disclosure may be applied, it should be recognized that the illustrated examples are only preferred examples and should not be taken as limiting the scope. Rather, the scope is defined by the following claims. We therefore claim all that comes within the scope and spirit of these claims.

We claim:

1. A gas turbine engine comprising:
a core engine comprising a low pressure turbine and defining a working gas flowpath and an inlet to the working gas flowpath;
a gearbox assembly coupled to the low pressure turbine;
a fan coupled to the gearbox assembly and having a fan diameter and a plurality of fan blades formed of a composite material, the fan blade defining a leading edge fan radius $R_{Fan\_LE}$ and a trailing edge fan radius $R_{Fan\_TE}$, and the fan defining a leading edge hub radius $R_{Hub\_LE}$ and a trailing edge hub radius $R_{Hub\_TE}$, the gas turbine engine defining a bypass ratio equal to a mass flowrate of an airflow from the fan over the core engine to a mass flowrate of an airflow from the fan through the inlet to the working gas flowpath during operation of the gas turbine engine in a cruise operating mode, the bypass ratio being greater than or equal to 10 and less than or equal to 30;
a blade effective acoustic length (BEAL) defined as:

$$BEAL = \frac{2c^2}{S(1-rr)N_b}\cos(\gamma)$$

wherein c is a chord length of a fan blade of the plurality of fan blades, S is a span of the fan blade, rr is a radius ratio of the fan, y is a stagger angle of the fan blade, and $N_b$ is the number of the plurality of fan blades;
a nacelle that includes a fan case that surrounds the fan;
a plurality of outlet guide vanes disposed aft of the fan and extending radially between the core engine and the fan case;
an acoustic spacing from the fan blade trailing edge to an outlet guide vane leading edge;
an acoustic spacing ratio (ASR) defined as:

$$ASR = \frac{1}{\left(\frac{Nv}{Nb}\right)} \cdot \frac{As}{BEAL}$$

wherein As is the acoustic spacing and Nv is the number of the plurality of outlet guide vanes, and the ASR of the gas turbine engine is 1.5 to 16.0; and
wherein the gas turbine engine defines a Fan Leading Edge to Trailing Edge Compression Factor (FLTCF) greater than or equal to 1.05 and less than or equal to 1.8, the FLTCF being equal to:

$$\frac{R_{Fan_{LE}} \times R_{Hub_{TE}}}{R_{Fan_{TE}} \times R_{Hub_{LE}}}.$$

2. The gas turbine engine of claim 1, wherein the fan case comprises an inlet disposed forward of the fan and an inlet length, wherein the inlet length is an axial distance between a leading edge of one of the plurality of fan blades and the inlet, as measured at a 75% span position of the fan blade, and wherein an inlet-to-nacelle (ITN) ratio is a ratio of the inlet length to a maximum diameter of the nacelle, wherein the ITN ratio is 0.23 to 0.35, and the plurality of fan blades have a blade solidity that is greater than or equal to 0.8 and less than or equal to 2.0.

3. The gas turbine engine of claim 1, wherein the FLTCF is greater than or equal to 1.07 and less than or equal to 1.65.

4. The gas turbine engine of claim 1, wherein the bypass ratio is greater than or equal to 10 and less than or equal to 25.

5. The gas turbine engine of claim 1, wherein the bypass ratio is greater than or equal to 10 and less than or equal to 20.

6. The gas turbine engine of claim 1, further comprising a disk-to-blade diametric (DBD) ratio defined as a ratio of a disk spacing length to the fan diameter, the disk spacing length being a distance between a forwardmost end of a fan disk and an intersection with the inlet taken along an engine centerline, wherein the DBD ratio of the gas turbine engine is 0.09 to 0.59.

7. The gas turbine engine of claim 1, further comprising a disk-to-nacelle diametric (DND) ratio defined as a ratio of a disk spacing length to the fan diameter, the disk spacing length being a distance between a forwardmost end of a fan disk and an intersection with the inlet taken along an engine centerline, wherein the DND ratio of the gas turbine engine is 0.07 to 0.47.

8. The gas turbine engine of claim 2, further comprising a disk-to-inlet length (DIL) ratio defined as a ratio of a disk spacing length to the inlet length, the disk spacing length being a distance between a forwardmost end of a fan disk and an intersection with the inlet taken along an engine centerline, wherein the DIL ratio of the gas turbine engine is 0.30 to 0.80.

9. The gas turbine engine of claim 1, wherein the leading edge fan radius $R_{Fan\_LE}$ is greater than or equal to 35 inches and less than or equal to 50 inches, wherein the fan defines a fan blade count greater than or equal to 12 and less than or equal to 22, and wherein the gearbox assembly has a gear ratio that is equal to or greater than 2:1 and equal to or less than 4:1.

10. The gas turbine engine of claim 9, wherein the FLTCF is greater than or equal to 1.12 and less than or equal to 1.35.

11. The gas turbine engine of claim 1, wherein the gas turbine engine defines a Fan Leading Edge to Trailing Edge Opening Ratio (FLTOR) greater than or equal to 1.03 and less than or equal to 1.5, the FLTOR being equal to:

$$\frac{R_{Fan_{LE}} - R_{Hub_{LE}}}{R_{Fan_{TE}} - R_{Hub_{TE}}}$$

12. The gas turbine engine of claim 1, wherein the ASR is 4.0 to 14.0.

13. The gas turbine engine of claim 1, wherein the ASR is 6.6 to 13.5.

14. The gas turbine engine of claim 1, wherein the fan case further comprises an acoustic treatment disposed on an interior surface of the fan case.

15. The gas turbine engine of claim 14, wherein a length of the acoustic treatment is 50% to 90% of the inlet length.

16. The gas turbine engine of claim 1, wherein the number of the plurality of outlet guide vanes is at least twice the number of the plurality of fan blades.

17. The gas turbine engine of claim 1, wherein the low pressure turbine comprises at least three low pressure turbine stages.

18. The gas turbine engine of claim 1, wherein the low pressure turbine comprises at least four low pressure turbine stages.

19. The gas turbine engine of claim 1, wherein the plurality of outlet guide vanes further comprise serrated leading edges.

20. The gas turbine engine of claim 1, wherein the plurality of fan blades comprise composite materials that include a matrix and a plurality of fiber plies, and the plurality of fiber plies are interwoven in in-plane and out-of-plane orientations.

* * * * *